Jan. 6, 1959  G. N. ROSA  2,867,121
PRESSURE TRANSDUCER
Filed May 17, 1954
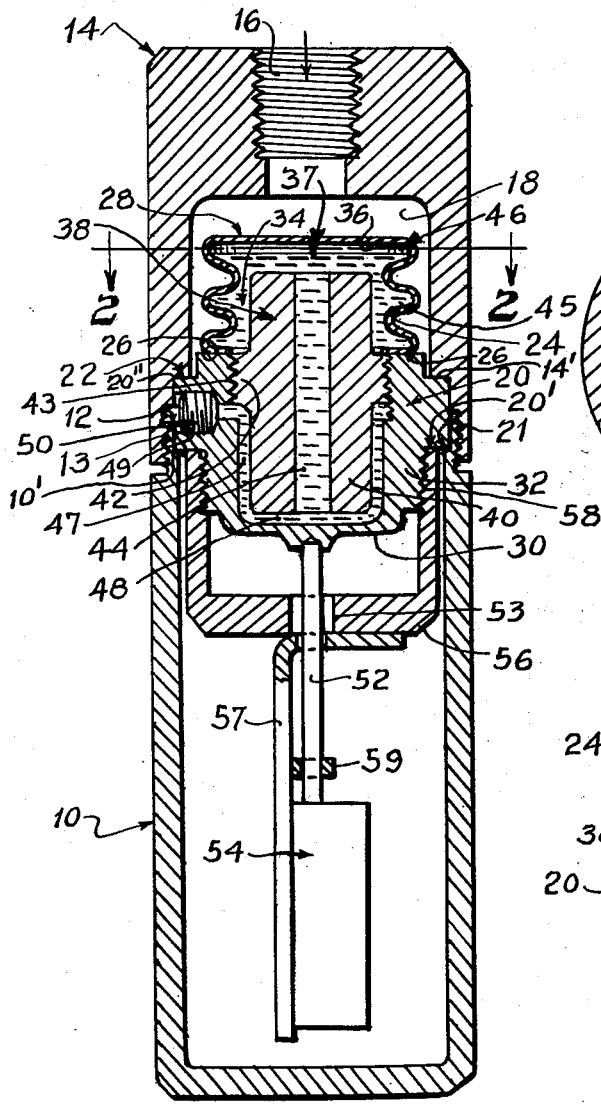
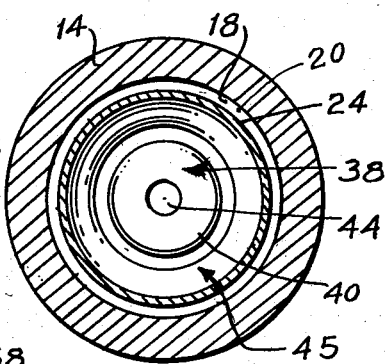
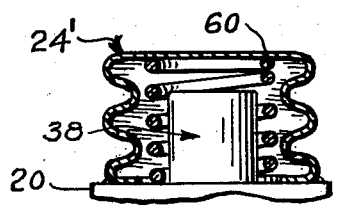
GILBERT N. ROSA
INVENTOR
BY
ATTORNEY.

United States Patent Office 2,867,121
Patented Jan. 6, 1959

2,867,121

PRESSURE TRANSDUCER

Gilbert N. Rosa, Beverly Hills, Calif., assignor to Statham Instruments, Inc., a corporation of California Application May 17, 1954, Serial No. 430,067

7 Claims. (Cl. 73—410)

This invention relates to a motion sensing device in the form of a pressure gage, and is particularly concerned with a pressure gage sensitive to pressures above a predetermined value.

In many instances it is desired to suppress the zero reading on a pressure gage, so that the gage will not register a pressure to which it is subjected until that pressure reaches a predetermined minimum value.

Hence, one object of this invention is to devise a pressure gage in the form of a suppressed zero pressure transducer.

Another object is to provide an instrument which is not responsive to pressure of low value and will only be responsive to pressures above a predetermined minimum value.

A still further aim of the invention is to devise a pressure gage which is only responsive to pressures in excess of a predetermined minimum and which is responsive to pressures within a selected range above this minimum.

Yet another object is the provision of a pressure gage of the foregoing type which is simple, rugged, and inexpensive, yet dependable in operation.

The above objects are accomplished by the instant invention, a preferred embodiment of which is described below taken in connection with the accompanying drawings, wherein:

Fig. 1 is a sectional elevational view of the invention device;

Fig. 2 is a horizontal section taken on line 2—2 of Fig. 1; and

Fig. 3 is a modification of a detail of the device of Fig. 1.

According to the invention, a closed chamber, preferably having a resilient wall, e. g., in the form of a bellows, is mounted within a case having a pressure inlet. The chamber is closed at one end adjacent the pressure inlet by an end member, and a sensing diaphragm is positioned across the other end of the chamber. The spring constant of the resilient wall or bellows of the chamber is made considerably smaller than that of the diaphragm, that is, such wall or bellows is much more compliant than the diaphragm for a reason hereinafter set forth. A motion sensing means or transducer is connected to the sensing diaphragm to sense the movement thereof in response to pressure applied against the diaphragm.

The chamber is evacuated and filled with liquid, leaving a void of predetermined volume between the liquid surface and the end member of the resilient wall or bellows, said resilient wall or bellows having sufficient stiffness to maintain said void against external pressure up to a predetermined amount exerted against said bellows, with the void having a low vapor pressure as pointed out below. Said predetermined pressure is the minimum pressure which the instrument is designed to register. When positive pressure is applied to the chamber, e. g., including a bellows, it will contract, reducing the volume of the void or bubble. The only pressure that the sensing diaphragm will detect under these conditions will be that due to the vapor pressure of the liquid in the bubble as its volume is reduced. Because of the stiffness of the diaphragm, this vapor pressure will be insufficient to cause deflection of the diaphragm. By a proper choice of a liquid of low vapor pressure, the value of the vapor pressure can be made extremely small. Suitable liquids include for example methyl silicone oil, or other low vapor pressure oils such as are used in vacuum pumps so that there is formed only an insignificant vapor pressure at normal room temperature. When the above noted predetermined pressure is reached, the void of bubble disappears almost completely, due to the contraction of the bellows, and the full pressure will then be transmitted through the liquid to the sensing diaphragm. The motion of the sensing diaphragm under this applied pressure will be transmitted through a linkage pin to a transducer. By a proper selection of spring constants of bellows and sensing diaphragm and a certain size void, it is possible to provide a pressure transducer the output of which will remain essentially zero from 0 p. s. i. pressure up to some predetermined pressure. After that pressure is reached, further increases in pressure will result in a linear output from the transducer element.

Referring to the drawing, 10 is a cylindrical case having an upper open end 12 to which is threadably connected, as at 13, a cylindrical pressure cap 14 having an inlet 16 for the introduction of pressure fluid into the interior 18 of the case.

A flange 20 is mounted within the case 10, the flange being supported within annular recesses 21 and 22 formed in the adjacent ends of case 10 and the pressure cap 14.

A bellows 24 is connected as by cementing or welding, to the upper shoulder 26 of flange 20, the bellows having a disk shaped member 28 connected across its upper end adjacent pressure inlet 16.

The flange 20 has integrally connected thereto a depending cup-shaped member 32, the bottom of which constitutes a sensing diaphragm 30. Liquid is placed in the closed chamber 34 formed by the bellows 24 and flange 20 with its cup member 32 including diaphragm 30. The liquid extends in chamber 34 to within a short distance from the top 28 of the bellows, leaving a void or space 36 between the surface 37 of the liquid and the member 28. This space occupies only a very minor portion of the volume of chamber 34, and is supported and maintained against collapse by the external pressure against bellows 24 and end member 28, by designing these latter elements of sufficient stiffness to prevent such collapse until the external pressure in space 18 reaches the predetermined minimum pressure which the instrument is designed to register.

A baffle 38 is immersed in the liquid to reduce the amount of liquid required in the bellows and chamber 34 in order to minimize temperature errors. This baffle is conveniently in the form of a cylindrical plug 40 having a flange 42 intermediate the ends of the plug, which flange is threadably engaged, as at 43, with internal threads on the upper end of flange 20. Plug 40 has an outer diameter less than that of the inside of the bellows 24 and also less than that of the inner periphery of flange 20 and cup member 32, and extends across chamber 34 upwardly to a relatively short distance below the top member 28 and downwardly to a relatively short distance above the bottom of diaphragm 30. Plug 40 has a central bore 44 therein which extends from end to end of the plug. The plug can contain more than one of such bores if desired. It will be observed that when the baffle or plug 40 is screwed into flange 20 it forms a first annular liquid space 45 between the plug and the bellows, a second liquid space 46 between the plug and member 28, a third annular liquid space 47 between the plug and the sides of cup member 32, and a fourth liquid space 48 between the plug and diaphragm 30.

A filling hole 49 is provided in flange 20, and is stoppered by a screw plug 50. Liquid introduced into chamber 34 containing baffle 38 fills spaces 45, 47, 48, and bore 44, and occupies a portion of the space 46, the surface of the liquid therein being spaced from the top member 28 to form the void 36 as noted above. It is thus seen that baffle 38 greatly decreases the amount of liquid required in chamber 34. It is understood, of course, that the baffle may be constructed of any desired size or configuration, and, if desired, the baffle may be completely eliminated without substantially affecting the operation of the device according to the invention, particularly where temperature variations are of small magnitude. When it is desired to use the instrument under conditions where the ambient temperature is varying under wide limits, the instrument may be temperature controlled by means of a heated thermal jacket or the like.

Connected to diaphragm 30 along the axis thereof is a linkage pin 52 which passes through a bore 53 in a transducer mount 56, and is connected at its opposite end to a motion sensing means in the form of a transducer, indicated generally by numeral 54. This may be any type of transducer, for example, an electrical strain gage type transducer illustrated in application Serial No. 354,294, filed May 11, 1953, now Patent No. 2,751,476, or an inductive type transducer illustrated in application Serial No. 328,416, filed December 29, 1952, now Patent No. 2,778,623, both by Louis D. Statham. The transducer 54 is supported on a bracket 57 connected by suitable means to the depending transducer mount 56 which is threadably secured by means of internal threads 58 at its upper end to external threads on the cup-shaped member 32 of flange 30. Pin 52 is guided for axial movement by member 59 connected to bracket 57.

To assemble the device of Figs. 1 and 2, baffle 38 is screwed into flange 20 with its cup-shaped member 32 and sensing diaphragm 30, and bellows 24 with its end member 28, is attached as by welding to the peripheral end of the flange 30. Liquid is then introduced through hole 49 into chamber 34 formed by the bellows 24 and cup member 32, leaving the void 36 at the top of the chamber, and the stopper 50 is screwed into place.

Linkage pin 52 attached to diaphragm 30 is then positioned for longitudinal movement through bore 53 in the transducer mount 56 and guide 59, and the mount is screwed onto flange 20. Pin 52 is then operatively connected to the transducer 54. This entire assembly is positioned within case 10, the assembly being supported by contact of the lower shoulder 20' of flange 20 with the horizontal shoulder 10' of case 10 formed by the recess 21. Cap 14 is then screwed onto the upper end of case 10 until the horizontal shoulder 14' of the cap formed by recess 22 is forced into contact with the upper shoulder 20" of flange 20 to form a tight connection between the cap 14 and case 10, and to hold the assembly firmly within the instrument housing.

It will be seen that on the application of liquid pressure through inlet 16 against the end member 28 of chamber 34, this member will be deflected downward. Since the bellows 24 is considerably less stiff than diaphragm 30, the bellows will contract while the diaphragm 30 remains undeflected as the void decreases in volume due to downward displacement of member 28 under such liquid pressure, the increasing vapor pressure of the liquid in the void under these conditions being insufficient to cause the diaphragm 30 to deflect, while permitting deflection of the bellows to decrease the void volume. When the applied pressure is of sufficient magnitude as to equal the predetermined minimum pressure to be registered by the instrument, such pressure causes the bellows to contract to a degree such that the top member 28 thereof makes contact with the liquid surface in space 46 and the void 36 has substantially disappeared, and the pressure applied through inlet 16 against member 28 is transmitted by the liquid to the sensing diaphragm 30. This diaphragm will now deflect to an extent proportional to the pressure applied to and transmitted through the liquid. The motion of the sensing diaphragm is transmitted through pin 52 to the transducer which, through connection to a conventional Wheatstone bridge circuit (not shown), as understood by those skilled in the art, will produce an output proportional to the motion of the sensing diaphragm 30, and hence proportional to the applied pressure. When such pressure is reduced, bellows 24 tends to expand to its initial position, carrying member 28 upward out of contact with the surface of the liquid in space 46 and causing diaphragm 30 to return to its normal undeflected position, which, through transducer 54, changes the output from the bridge circuit.

It is seen that the instrument of the invention will accordingly not register pressure until member 28 has made contact with the upper surface of the liquid as result of the application of a minimum preselected pressure value above zero. At pressures above this value, the output from the transducer will be directly proportional to the pressure applied up the maximum pressure for which the instrument is designed.

If desired, as shown in Fig. 3, a bellows 24' having a spring 60 longitudinally positioned within the bellows may be used in place of bellows 24. Spring 60 decreases the resiliency of the bellows, and increases the range, i. e., the magnitude of the pressure, to which the device is sensitive.

While in the embodiment shown and described, member 28 connected across the top of the bellows is relatively rigid, this member may be made sufficiently thin and constructed of a material such that member 28 will deflect on the application of pressure. If such member is made sufficiently resilient, bellows 24 may be replaced by rigid walls, and on the application of pressure to member 28, the latter will deflect until it makes contact with the surface of the liquid in chamber 34, at which time the applied pressure will be transmitted by the liquid to diaphragm 30, the deflection of which will be sensed by the transducer, as described above. Of course, member 28 must be sufficiently stiff to maintain the void up to the minimum pressure which the instrument is designed to register.

While I have described a particular embodiment of my invention for the purpose of illustration, it should be understood that various modifications and adaptations thereof may be made within the spirit of the invention as set forth in the appended claims.

I claim:

1. A fluid pressure sensing device, which comprises a yieldable container closed at one end, said container being subject to a pressure to be sensed, a resilient member forming a closure opposite the other end of said container, a substantially rigid member positioned between said yieldable container and said resilient member, the stiffness of said resilient member being substantially greater than the stiffness of said yieldable container, liquid in said container and in contact with said resilient member, said liquid partially filling said container and leaving a void of low vapor pressure therein adjacent said one end of said container, said yieldable container having sufficient stiffness to maintain said void against external pressure up to a predetermined external pressure, said void being of minor volume relative to the total volume of said container, and motion sensing means connected to said resilient member.

2. A force sensing device, which comprises a closed container, said container having a resilient wall adjacent one end thereof, said resilient wall being responsive to a force to be sensed, a sensing diaphragm forming the other end of said container, a substantially rigid wall between said resilient wall and said diaphragm the stiffness of said diaphragm being substantially greater than the stiffness of said resilient wall, liquid in said container, said liquid partially filling said container and being in contact with said diaphragm, leaving a void in said container of low vapor pressure and minor volume relative to the volume of said container, said void being disposed between the free surface of said liquid and said one end of said container, said resilient wall having sufficient stiffness to maintain said void against external pressure up to a predetermined external pressure, and a transducer connected to said sensing diaphragm.

3. A motion sensing device as defined in claim 1, including a member positioned in said liquid to decrease the amount of liquid required to occupy a predetermined volume of said container.

4. A fluid pressure sensing device, which comprises a closed container, the side wall adjacent one end thereof being in the form of a bellows, said bellows being subject to the pressure to be sensed, a sensing diaphragm forming the other end of said container, a substantially rigid wall between said bellows and said diaphragm, the spring constant of said bellows being substantially smaller than that of said diaphragm, liquid in said container, said liquid partially filling said container and being in contact with said diaphragm, leaving a void of low vapor pressure and relatively short length between the free surface of said liquid and said one end of said container, said void having a minor volume relative to that of said container and of said liquid, said bellows having sufficient stiffness to maintain said void against external pressure up to a predetermined external pressure, and a transducer connected to said diaphragm.

5. A pressure gage sensitive only to pressures above a predetermined value, which comprises a case having a pressure inlet, a closed container mounted in said case, one end of said container being disposed adjacent said pressure inlet, said container having a resilient wall forming a chamber between said case and said wall, said resilient wall being subject to the pressure to be sensed, a sensing diaphragm forming the other end of said container and located exteriorly of said chamber, a substantially rigid wall between said resilient wall and said diaphragm, the stiffness of said diaphragm being substantially greater than the stiffness of said resilient wall, liquid in said container, said liquid partially filling said container and leaving a void of low vapor pressure between the surface of said liquid and said one end of said container, said resilient wall having sufficient stiffness to maintain said void against external pressure up to a predetermined external pressure, and motion sensing means connected to said diaphragm.

6. A pressure gage as defined in claim 5, including a baffle immersed in said liquid to decrease the amount of liquid required to occupy a predetermined volume of said container, said baffle including a liquid passage communicating with the liquid adjacent said void and the liquid adjacent said diaphragm.

7. A pressure gage sensitive only to pressures above a predetermined value, which comprises a cylindrical case, a cylindrical cap mounted on said case and having a pressure inlet, a cup-shaped member mounted in said case, the bottom of said member forming an integral sensing diaphragm, a bellows longitudinally disposed in said case, along the axis of said cup-shaped member and forming a chamber between said case and said bellows, said diaphragm being located exteriorly of said chamber, said bellows being subject to the pressure to be sensed, the lower end of said bellows being open and connected to the open end of said cup-shaped member, the spring constant of said bellows being substantially smaller than that of said diaphragm, a closure connected across the upper end of said bellows, said closure being disposed adjacent said pressure inlet, a liquid of relatively low vapor pressure in said cup-shaped member and said bellows, said liquid partially filling said bellows and being in contact with said diaphragm, leaving a void of low vapor pressure and relatively short length between the free surface of said liquid in said bellows and said closure, said void having a minor volume relative to that of said bellows and of the liquid therein, said bellows having sufficient stiffness to maintain said void against external pressure up to a predetermined external pressure, a baffle immersed in said liquid and supported by said cup-shaped member, to decrease the amount of liquid required to occupy a predetermined volume of said cup-shaped member and said bellows, said baffle being spaced from said diaphragm and the top surface of said liquid, and said baffle including a liquid passage communicating with the liquid adjacent said void and the liquid adjacent said diaphragm, a transducer mounted in said case, and a mechanical linkage between said diaphragm and said transducer.

References Cited in the file of this patent

UNITED STATES PATENTS

| | | |
|---|---|---|
| 2,007,363 | Boynton | July 9, 1935 |
| 2,244,334 | Hopkins | June 3, 1941 |
| 2,400,467 | Ruge | May 14, 1946 |
| 2,466,071 | Barnes et al. | Apr. 5, 1949 |
| 2,592,009 | Clement et al. | Apr. 8, 1952 |
| 2,699,069 | Bailey | Jan. 11, 1955 |
| 2,725,749 | Green | Dec. 6, 1955 |

FOREIGN PATENTS

| | | |
|---|---|---|
| 834,242 | France | Aug. 8, 1938 |
| 688,097 | Germany | Feb. 12, 1940 |
| 578,632 | Great Britain | July 5, 1946 |